US008185604B2

(12) United States Patent
Forrester

(10) Patent No.: US 8,185,604 B2
(45) Date of Patent: May 22, 2012

(54) METHODS AND SYSTEMS FOR RETRIEVING INFORMATION OVER A COMPUTER NETWORK

(76) Inventor: Glenn C. Forrester, Piedmont, CA (US)

( * ) Notice: Subject to any disclaimer, the term of this patent is extended or adjusted under 35 U.S.C. 154(b) by 1308 days.

(21) Appl. No.: 10/803,288

(22) Filed: Mar. 18, 2004

(65) Prior Publication Data
US 2005/0114441 A1 May 26, 2005

Related U.S. Application Data

(60) Provisional application No. 60/524,939, filed on Nov. 25, 2003.

(51) Int. Cl.
G06F 15/16 (2006.01)
(52) U.S. Cl. ........................................................ 709/217
(58) Field of Classification Search .................. 707/100; 709/217
See application file for complete search history.

(56) References Cited

U.S. PATENT DOCUMENTS

| 6,098,065 | A | * | 8/2000 | Skillen et al. ...................... 707/3 |
| 6,256,623 | B1 | * | 7/2001 | Jones ............................. 707/765 |
| 6,272,490 | B1 | * | 8/2001 | Yamakita ............................... 1/1 |
| 6,338,059 | B1 | * | 1/2002 | Fields et al. ..................... 715/208 |
| 6,341,306 | B1 | | 1/2002 | Rosenschein et al. |
| 6,393,443 | B1 | | 5/2002 | Rubin et al. |
| 6,460,060 | B1 | * | 10/2002 | Maddalozzo et al. ......... 715/234 |
| 6,519,631 | B1 | | 2/2003 | Rosenschein et al. |
| 6,535,912 | B1 | * | 3/2003 | Anupam et al. .............. 709/217 |
| 6,735,347 | B1 | * | 5/2004 | Bates et al. .................... 382/282 |
| 6,862,710 | B1 | * | 3/2005 | Marchisio ..................... 715/206 |
| 7,136,875 | B2 | * | 11/2006 | Anderson et al. ..................... 1/1 |
| 7,257,585 | B2 | * | 8/2007 | Stevenson et al. ............ 707/100 |
| 7,308,439 | B2 | * | 12/2007 | Baird et al. .................... 707/758 |
| 7,457,798 | B2 | * | 11/2008 | Capps .................................. 1/1 |
| 7,725,487 | B2 | * | 5/2010 | Nadamoto et al. ............ 707/769 |
| 7,836,010 | B2 | * | 11/2010 | Hammond et al. ........... 707/705 |
| 2002/0033844 | A1 | * | 3/2002 | Levy et al. ..................... 345/744 |
| 2002/0188603 | A1 | * | 12/2002 | Baird et al. ....................... 707/3 |
| 2003/0036964 | A1 | * | 2/2003 | Boyden et al. ................. 705/26 |
| 2004/0015484 | A1 | * | 1/2004 | Debaty .............................. 707/3 |
| 2004/0019653 | A1 | * | 1/2004 | Debaty et al. ................. 709/217 |
| 2005/0149395 | A1 | * | 7/2005 | Henkin et al. .................. 705/14 |
| 2006/0155728 | A1 | * | 7/2006 | Bosarge ......................... 707/100 |
| 2006/0168541 | A1 | * | 7/2006 | Hill et al. ....................... 715/810 |
| 2007/0073581 | A1 | * | 3/2007 | Kempe et al. ................... 705/14 |
| 2007/0075916 | A1 | * | 4/2007 | Bump et al. ................... 345/3.1 |
| 2007/0077665 | A1 | * | 4/2007 | Bump et al. ..................... 438/14 |
| 2007/0078540 | A1 | * | 4/2007 | Bump et al. ..................... 700/90 |
| 2007/0079250 | A1 | * | 4/2007 | Bump et al. ................... 715/762 |
| 2007/0130002 | A1 | * | 6/2007 | Moran et al. .................... 705/14 |
| 2007/0208610 | A1 | * | 9/2007 | Pisaris-Henderson et al. . 705/10 |

* cited by examiner

Primary Examiner — Wing Chan
Assistant Examiner — Alicia Baturay
(74) Attorney, Agent, or Firm — Armstrong Teasdale LLP

(57) ABSTRACT

A method for retrieving information is provided. The method uses a server system coupled to a centralized database and at least one client system. The method includes selecting an object from an electronic document displayed on a client system, displaying a function menu on the client system to prompt a user to select a desired function, transmitting the selected object and a selected function from the client system to the server system, processing the selected object by applying the selected function at the server system, communicating with a vendor web server to complete the processing of the selected object, and transmitting at least one of a resulting web page and other output to the client system.

22 Claims, 5 Drawing Sheets

METHODS AND SYSTEMS FOR RETRIEVING INFORMATION OVER A COMPUTER NETWORK

CROSS REFERENCE TO RELATED APPLICATION

This application claims the benefit of U.S. Provisional Application No. 60/524,939, filed Nov. 25, 2003.

BACKGROUND OF THE INVENTION

This invention relates generally to retrieving information over a computer network and, more particularly, to retrieving information over a computer network by selecting an object included within an electronic document.

The Internet is an electronic communications network that connects computer networks and organizational computer facilities around the world. As the Internet has evolved and matured over the years, the use of it by most users has settled into predictable patterns. More specifically, a variety of web sites on the Internet have evolved over the years that can be used to perform specific functions for users. A typical user may use a set of just a few web sites on the Internet to accomplish the majority of their online tasks. These web sites have evolved based on the predictable patterns of Internet users. The tasks performed by these users range from a "Perform a Search" on a particular word and/or phrase to get more information to buy a particular book from Amazon.com® or to rent a movie from Netflix.com® (Amazon.com is a registered trademark of Amazon.com, Inc., South Seattle, Wash.; and NetFlix.com is a registered trademark of NetFlix.com, Inc., Los Gatos, Calif.).

While in many cases the impetus to perform one of these tasks may come from a source outside of a user's personal computer, for example hearing about an interesting book during a conversation with a friend, in many other cases, the impetus comes in the form of a web page, an email or other computer readable document. Although it would seem on the surface that in the latter case it would be much easier to perform a desired task, like buying a book whose title appears in an article that someone was reading online, this is rarely the case.

A current limitation of web pages, emails and other electronic documents as they currently exist is that unless the author/designer of the document has explicitly created a link for a particular piece of text or other graphically displayed object, that object can not be used as a link to a web site through which a task can be performed.

For example, if a title of a book appears in an article that a user is reading on a web page and it was not specifically linked to Amazon.com®, the user would likely have to undertake the following steps to purchase the book: select and "copy" the book title from the web page; open a new browser window; navigate to the Amazon.com® (or other online book vendor) web site; paste the book title into the search field on the Amazon.com® home page; click the "Search" button; and click the "Purchase with One-click" button on the resulting web page.

In the example described above, the designer of the web page could have designed the web page such that the title of the book was a link to a web page for buying the book. However, web page designers typically do not include such links unless the web page designer has a particular commercial interest in promoting the sale of books and collecting a fee for enabling the sale of the book. Furthermore, even if the web page designer had designed the web page such that a mentioned book could be easily bought, the user would be limited to using the vendor that had been selected by the web page designer. The user might prefer to buy their books from another vendor, for example, Barnes and Noble® (Barnes and Noble is a registered trademark of Barnes & Noble Bookstores, Inc., New York, N.Y.). Furthermore, in the example above, the user may not want to buy the book, but rather may want to perform a Google® search on the title of the book to find a review of it (Google is a registered trademark of Google Inc., Mountain View, Calif.).

Electronic documents, as currently designed and implemented, present text and graphics on a page, but are limited to imbuing particular objects with exactly zero or one hyperlink. It is only in a relatively few number of cases wherein the web designer can reliably predict what a user might want to use such a link for, and even a fewer number of cases wherein the web designer knows from which vendor the user might wish to request such services as might be provided via that link.

There is commercially available software that allows a user to click on a word and see a translation of the word into a second language. Such commercially available software packages include: TechnoCraft's RoboWord, Mashov Software's Babylon, and Accent Software's WordPoint (RoboWord is commercially available through TechnoCraft Co., Ltd, Tokyo, Japan; Babylon is commercially available through Mashov Computers Ltd, Israel; and WordPoint is commercially available through Accent Software International, Ltd., Israel). In these software packages, one or more electronic dictionaries are provided and are stored on the user's computer such that the user can click on a word and see a translation of the word into a second language. However, none of these software packages enable a user to select a word within an electronic document and link to a selected web site.

Other commercially available software packages, for example Connect Innovation's software package FlySwat®, looks at text downloaded by the browser and continually accesses and displays data from and hyperlinks to other web sites deemed relevant by FlySwat® (FlySwat is a registered trademark of flyswat, Inc., San Francisco, Calif.). However, none of these software packages enable a user to select a word within an electronic document and link to a user-selected web site.

Other commercially available software packages, for example GuruNet, enables a user to click on a word and retrieve a web page from the GuruNet server that provides information from the GuruNet proprietary database related to that word (GuruNet is commercially available through Atomica Corporation, Wesley Hills, N.Y.). However, none of these software packages enable a user to select a word within an electronic document and link to a user-selected web site on the Internet.

BRIEF DESCRIPTION OF THE INVENTION

In one aspect, a method for retrieving information is provided. The method uses a server system coupled to a centralized database and at least one client system. The method includes selecting an object from an electronic document displayed on a client system, displaying a function menu on the client system to prompt a user to select a desired function, transmitting the selected object and a selected function from the client system to the server system, processing the selected object by applying the selected function at the server system, communicating with a vendor web server (also known as a target web server) to complete the processing of the selected object, and transmitting at least one of a resulting web page and other output to the client system.

In another aspect, a network based system for retrieving information is provided. The system includes a client system having a user interface and a browser, a centralized database for storing information, and a server system. The server system is configured to be coupled to the client system and the database. The server system is further configured to enable a user to select an object from an electronic document displayed on the user interface, display a function menu on the user interface to prompt a user to select a desired function, receive the selected object and the selected function from the client system, process the selected object by applying the selected function, communicate with a target web server to complete the processing of the selected object, and transmit at least one of a resulting web page and other output to the client system.

In another aspect, a computer program embodied on a computer readable medium for retrieving information using a server system coupled to a client system and a database is provided. The client system includes a user interface. The program includes a code segment that prompts a user to select an object from an electronic document displayed on the user interface and then displays a function menu on the user interface to prompt the user to select a desired function. The code segment then transmits the selected object and the selected function from the client system to the server system, processes the selected object by applying the selected function at the server system, communicates with a target web server to complete the processing of the selected object, and transmits at least one of a resulting web page and other output to the client system.

In another aspect, a system and method is provided that enables any piece of selected text or other "object" in an electronic document to function as a hyperlink regardless of whether or not the object was designed by the document's author as a hyperlink.

In another aspect, a system and method is provided that enables a user to specify a different vendor web site for an existing hyperlink.

In another aspect, a system and method is provided that enables any piece of selected text or other "object" in an electronic document to function as a hyperlink to a variety of different web sites.

In another aspect, a system and method is provided that enables a user to select which web site a link will target from a customized menu of functions.

In another aspect, a system and method is provided that enables a user to select a function within a particular web site that a link will target from a customized menu of functions.

In another aspect, a system and method is provided that enables a user from a client system to select a word or words or any selectable object in an electronic document displayed on the client system using a pointing device or any other method of navigating and selecting elements of an electronic document. The user then designates a function to be performed. The client system then transmits the selected word(s) or object and the name of the function to be performed over a network to a function server. The function server processes the selection in the context of the function and then transmits the URL or URLs to a vendor server on the network which then performs the designated function. Any result transmitted from the vendor server to the function server is then processed by the function server and the result is transmitted to the client system. The client system receives the result from the function server and processes that result and completes the execution of the function for the user.

In another aspect, a system and method is provided that enables a user to select a word or string of words from text within a document displayed on a client system using a mouse. The user then displays a list of functions by at least one of right-clicking the mouse, using a key sequence such as CTRL-ALT-?, and clicking the mouse on the selection while holding down an "Alt" key. The client system then displays a list of functions for the user to select. In an example embodiment, a function would include "Do a Google Search". The client system would then transmit the selected text along with the name or other identifier of the function to a function server. The function server would construct a URL that includes the selected text and transmit that URL to the Google® server. In this case, the Google® server would execute a search based on the selected text and return a web page to the function server with the results of the search. The function server would then transmit that page back to the client system. The client system would, in turn, display that page in a new browser window.

In another aspect, example embodiments of the invention can be viewed in contrast to other methods of accessing network resources in that any selectable object displayed by an application program that is running on a client system can function as a hyperlink to network resources.

In another aspect, a system and method is provided wherein any object within an electronic document may function as a hyperlink to any one of many different network resources depending on the function selected by the user.

In another aspect, a selected object will typically be a word or phrase, but in at least one embodiment of the invention the selected object may be a picture, sound file, video file or any other type of digital data. For example, a picture could be selected and a function invoked that would place the picture in an online photo album like those supported by web sites like Ofoto.com (Ofoto is a registered trademark of Ofoto, Inc., Emeryville, Calif.).

In another aspect, a displayed object will already function as a hyperlink. In those cases, the object that includes the hyperlink may be selected and a function invoked using the object of the hyperlink, while the target of the hyperlink is ignored. For example, a book title displayed on a web page may be a hyperlink to the book's web page on Amazon.com®, but the user could select the book title and invoke a function that purchases the book from Barnes and Noble®.

In another aspect, displayed objects that act as hyperlinks may be selected and the target of the hyperlink may be designated as the selected object as opposed to the displayed object itself. The user may click on the link while holding down an "Alt" and "Ctrl" keys. This would indicate that the link itself was to be used as input to the function that would be subsequently selected from the displayed list of functions.

In another aspect, the object may be selected using methods other than a pointing device. For example the "Tab and/or "Arrow" keys or voice commands may be used to navigate through a display of selectable objects. Once the desired objects are selected, any unique sequence or combination of keys, mouse clicks, voice commands or other inputs can be used to call up a list of functions. The user may then select the specific function using any of the aforementioned selection methods (e.g., mouse, Tab key, Arrow key, Return key, or voice commands).

In another aspect, the user may be unable to select displayed text as text but only as an image. In such cases, the example embodiment enables the user to select a portion of the image that includes the desired text and that portion of the image would be treated as the selection. If the selected function required text as an input, either the client system would use OCR (optical character recognition) software to process the image and extract the text for transmission to a function server or the selected portion of the image would be transmitted to the function server and the function server would process the image using OCR software to extract the text for transmission to the web server that will ultimately perform the requested function.

In another aspect, a text-grabbing algorithm may be executed by the client system to determine a word or series of words selected by the user. In an embodiment utilizing a "text-grabbing" algorithm, a client system, knowing the position indicated by a pointing device, determines what text is displayed at the known position and extracts that text and/or surrounding text for transmission to the web server that will ultimately perform the requested function.

In another aspect, a display from which an object is selected may include a television, for example, a Web-TV, showing television programming which includes text or additional graphics on the display. In another embodiment, the display from which the object is selected may include a terminal which merely acts as a display for an application that is actually running on a central server. In either case, the user may designate any selectable object and invoke a function for executing in any of the manners described herein. Furthermore, client systems could be any device capable of interconnecting to the Internet including a web-based phone, personal digital assistant (PDA), or other web-based connectable equipment.

In another aspect, a network is provided that includes the Internet, or an intranet, for example, a corporate intranet. A server system on a corporate intranet preferably performs functions and services for the client systems connected to the intranet server, and additionally enables functions and services to be requested from external servers, for example, through the Internet, using principles of the present invention.

In another aspect, a function may require additional information. For example, the present invention may include a function designed to use a book title to purchase a copy of that book from Amazon.com® as a gift for someone. In such a case, the invocation of the function would necessitate the display of a dialogue box by a client system that would require the user to provide information necessary, specifically the name and address of the recipient of the gift, to complete the transaction with the chosen vendor.

In another aspect, a function server may construct several URLs to be transmitted to a vendor server in order to complete a function because the function can not be invoked with a single request. In at least some scenarios of the gift book example described above, more than one request of the vendor server would be required. In another embodiment, a function server may have to construct URLs for more than one vendor server to complete a request, for example, a function that automatically bought a book from the cheaper of Amazon.com® and Barnes and Noble®. In such cases, the function server may also process and/or extract data from the web page returned by the vendor server(s).

In another aspect, a function server may simply transmit to a client system a web page that was transmitted to the function server by a vendor server. However, in other aspects, the function server may return only a portion of that web page. In yet other cases, the function server may extract data from the web page returned by the vendor server and construct a web page with the relevant information to be transmitted to the client system. Furthermore, the function server may transmit the result of the operation through other means, for example email or fax.

In another aspect, a function server may add advertisements or other information to the result to be transmitted to a client system.

In another aspect, results transmitted to a client system may be processed by the client system upon receipt. The client system may offer the user a choice of functions to perform on a web page that is returned by a function server, for example, print, open page in a new window, or save page to a disk.

DETAILED DESCRIPTION OF THE INVENTION

Example embodiments of systems and processes that facilitate retrieving information over a computer network by creating a hyperlink are described below in detail. At least one technical effect of the Information Retrieval System (IRS) includes enabling a user to select any piece of text or other "object" in an electronic document and cause it to function as a hyperlink regardless of whether or not the object was designed by the document's author as a hyperlink. An electronic document includes a Web document and any other document displayable using a computer system.

In the example embodiment, the systems and processes enable a user to specify a different vendor web site for an existing hyperlink. Furthermore, the example systems and processes provide a mechanism that enables any piece of selected text or other "object" in an electronic document to function as a hyperlink to a variety of different web sites. The example systems and processes also provide the user with a mechanism for selecting which web site the link should target from a customized menu of functions. Moreover, the example systems and processes provide the user with a mechanism for selecting what function within a particular web site the link should target from a customized menu of functions.

In one embodiment, a computer program is provided, and the program is embodied on a computer readable medium and utilizes a Structured Query Language (SQL) with a client user interface front-end for administration and a web interface for standard user input and reports. In an example embodiment, the system is web enabled and is run on a business-entity intranet. In yet another embodiment, the system is fully accessed by individuals having an authorized access outside the firewall of the business-entity through the Internet. In a further example embodiment, the system is being run in a Windows® NT environment (Windows is a registered trademark of Microsoft Corporation, Redmond, Wash.). The application is flexible and designed to run in various different environments without compromising any major functionality.

The systems and processes are not limited to the specific embodiments described herein. In addition, components of each system and each process can be practiced independent and separate from other components and processes described herein. Each component and process also can be used in combination with other assembly packages and processes.

Figure 1:
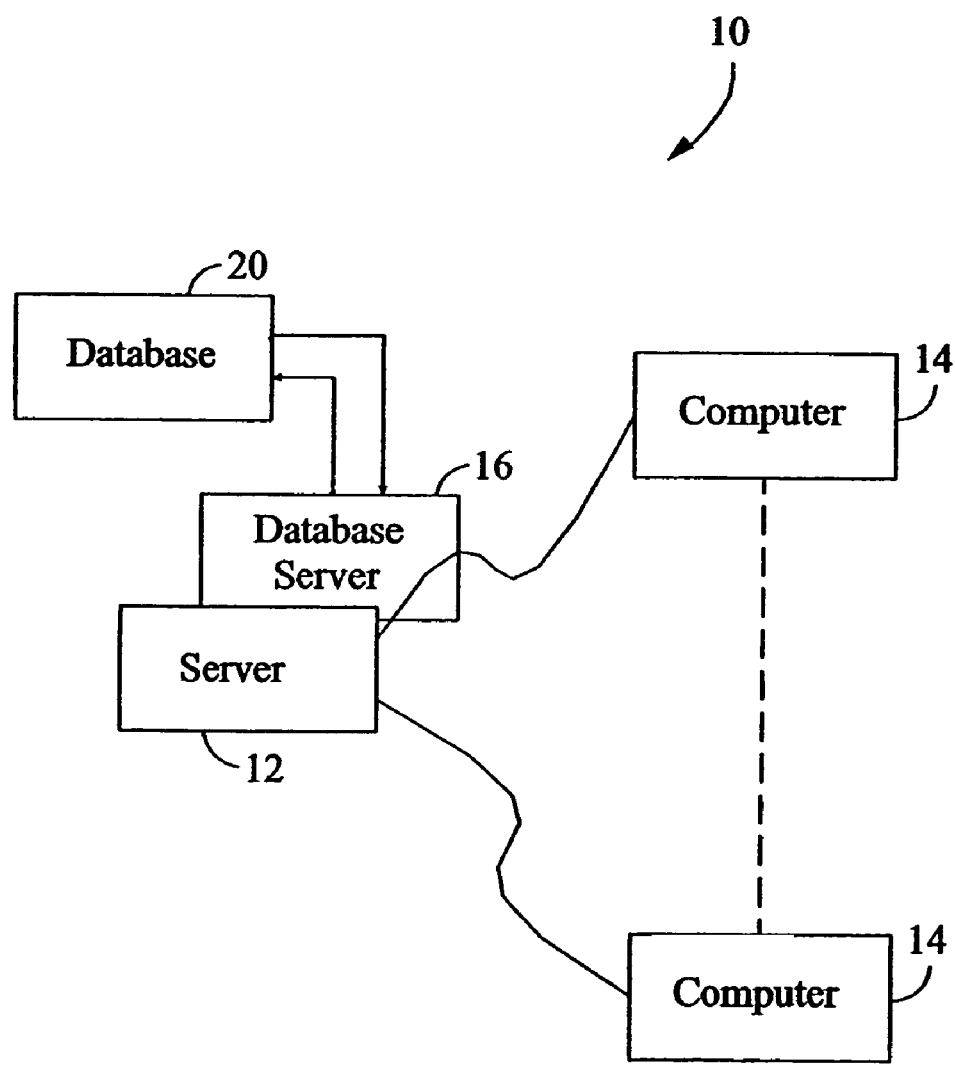
FIG. 1 is a simplified block diagram of an Information Retrieval System (IRS) in accordance with one embodiment of the present invention.

FIG. 1 is a simplified block diagram of an Information Retrieval System (IRS) 10 including a server system 12, and a plurality of client sub-systems, also referred to as client systems 14, connected to server system 12. In one embodiment, client systems 14 are computers including a web browser, such that server system 12 is accessible to client systems 14 via the Internet. Client systems 14 are interconnected to the Internet through many interfaces including a network, such as a local area network (LAN) or a wide area network (WAN), dial-in-connections, cable modems and special high-speed ISDN lines. Client systems 14 could be any device capable of interconnecting to the Internet including a web-based phone, personal digital assistant (PDA), or other web-based connectable equipment. A database server 16 is connected to a database 20 containing information on a variety of matters, as described below in greater detail. In one embodiment, centralized database 20 is stored on server system 12 and can be accessed by potential users at one of client systems 14 by logging onto server system 12 through one of client systems 14. In an alternative embodiment database 20 is stored remotely from server system 12 and may be non-centralized.

Figure 2:
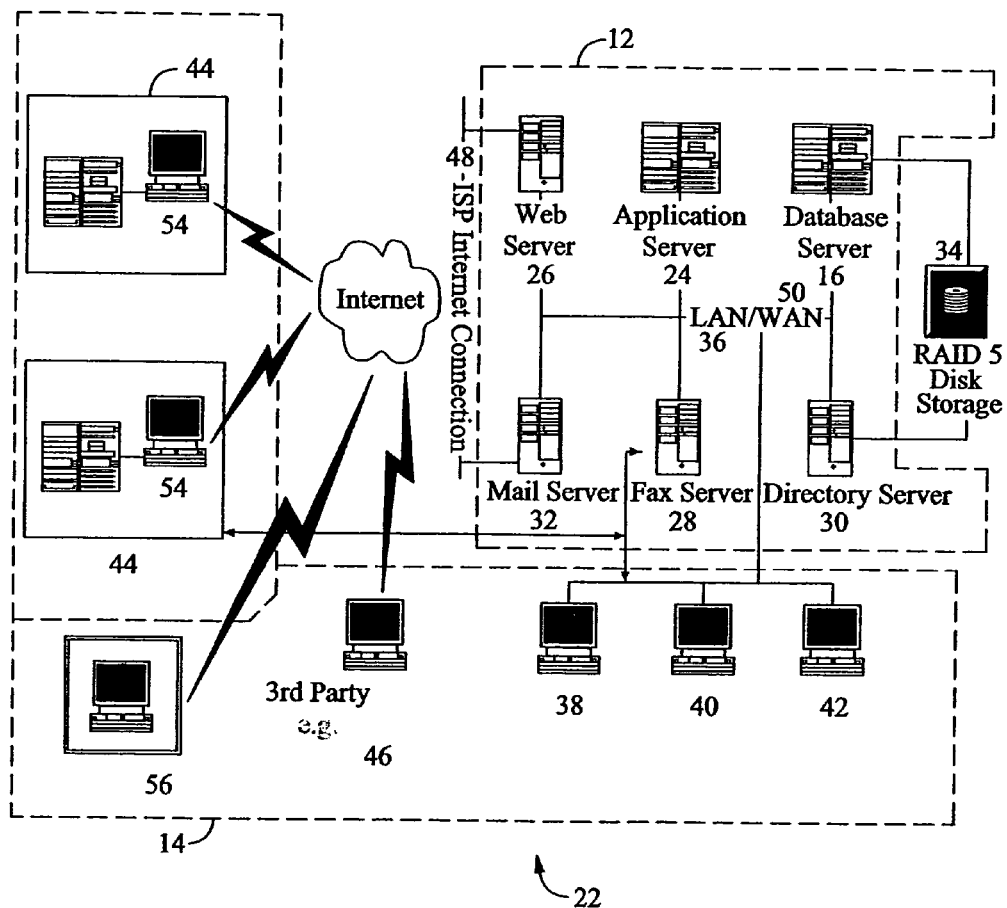
FIG. 2 is an expanded version block diagram of an example embodiment of a server architecture of an IRS.

FIG. 2 is an expanded block diagram of an example embodiment of a server architecture of an IRS 22. Components in system 22, identical to components of system 10 (shown in FIG. 1), are identified in FIG. 2 using the same reference numerals as used in FIG. 1. System 22 includes server system 12 and client systems 14. Server system 12 further includes database server 16, an application server 24, a web server 26, a fax server 28, a directory server 30, and a mail server 32. A disk storage unit 34 is coupled to database server 16 and directory server 30. Servers 16, 24, 26, 28, 30, and 32 are coupled in a local area network (LAN) 36. In addition, a system administrator's workstation 38, a user workstation 40, and a supervisor's workstation 42 are coupled to LAN 36. Alternatively, workstations 38, 40, and 42 are coupled to LAN 36 via an Internet link or are connected through an Intranet.

Each workstation, 38, 40, and 42 is a personal computer having a web browser. Although the functions performed at the workstations typically are illustrated as being performed at respective workstations 38, 40, and 42, such functions can be performed at one of many personal computers coupled to LAN 36. Workstations 38, 40, and 42 are illustrated as being associated with separate functions only to facilitate an understanding of the different types of functions that can be performed by individuals having access to LAN 36.

Server system 12 is configured to be communicatively coupled to various individuals, including employees 44 and to third parties 46 via an ISP Internet connection 48. The communication in the example embodiment is illustrated as being performed via the Internet, however, any other wide area network (WAN) type communication can be utilized in other embodiments, i.e., the systems and processes are not limited to being practiced via the Internet. In addition, and rather than WAN 50, local area network 36 could be used in place of WAN 50.

In the example embodiment, any authorized individual having a workstation 54 can access IRS 22. At least one of the client systems includes a manager workstation 56 located at a remote location. Workstations 54 and 56 are personal computers having a web browser. Also, workstations 54 and 56 are configured to communicate with server system 12. Furthermore, fax server 28 communicates with remotely located client systems, including a client system 56 via a telephone link. Fax server 28 is configured to communicate with other client systems 38, 40, and 42 as well.

Figure 3:
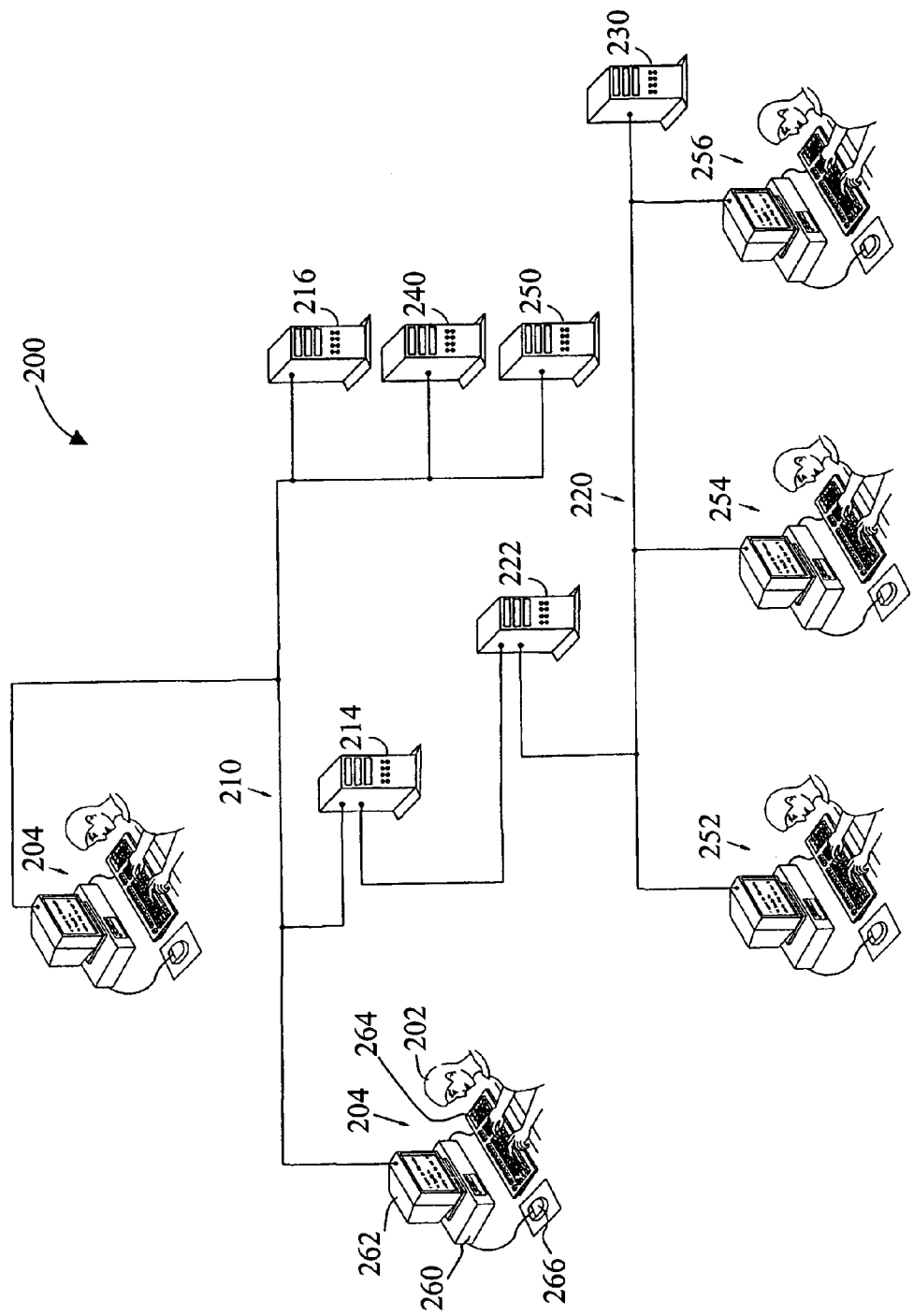
FIG. 3 is a schematic illustration of an example embodiment of an IRS.

FIG. 3 is a schematic illustration of an example embodiment of IRS 200. IRS 200 enables a user 202 of a client system 204 to automatically access resources through a network 210. A function server 214 processes a resource request from client system 204. Responsive to the processing, function server 214 constructs and transmits a resource request for a vendor server 216. Function server 214 receives the result of the resource request from vendor server 216, processes that result and transmits the result of that processing back to client system 204. In another embodiment, function server 214 retrieves the data through network 210 or intranet 220 via a firewall or proxy server 222 from one or more vendor servers 230. In another embodiment, function server 214 retrieves the data through network 210 from one or more vendor servers 216, 240, 250.

In one embodiment, the client systems included on intranet 220 include at least client system 252, 254, 256.

Client system 204 includes a processor 260, a display 262, a keyboard 264, and a pointing device 266. Pointing device 266 includes at least one of a mouse, a track-ball, a joystick, a digitizing pad, a touch screen, and a keyboard. Client system 204 includes substantially any electronic device capable of presenting text or graphics for a user to view. For example, client system 204 includes, but is not limited to, at least one of a cell phone, a desktop computer, a personal digital assistant (PDA) which communicates via a wireless network, or a television.

Figure 4:
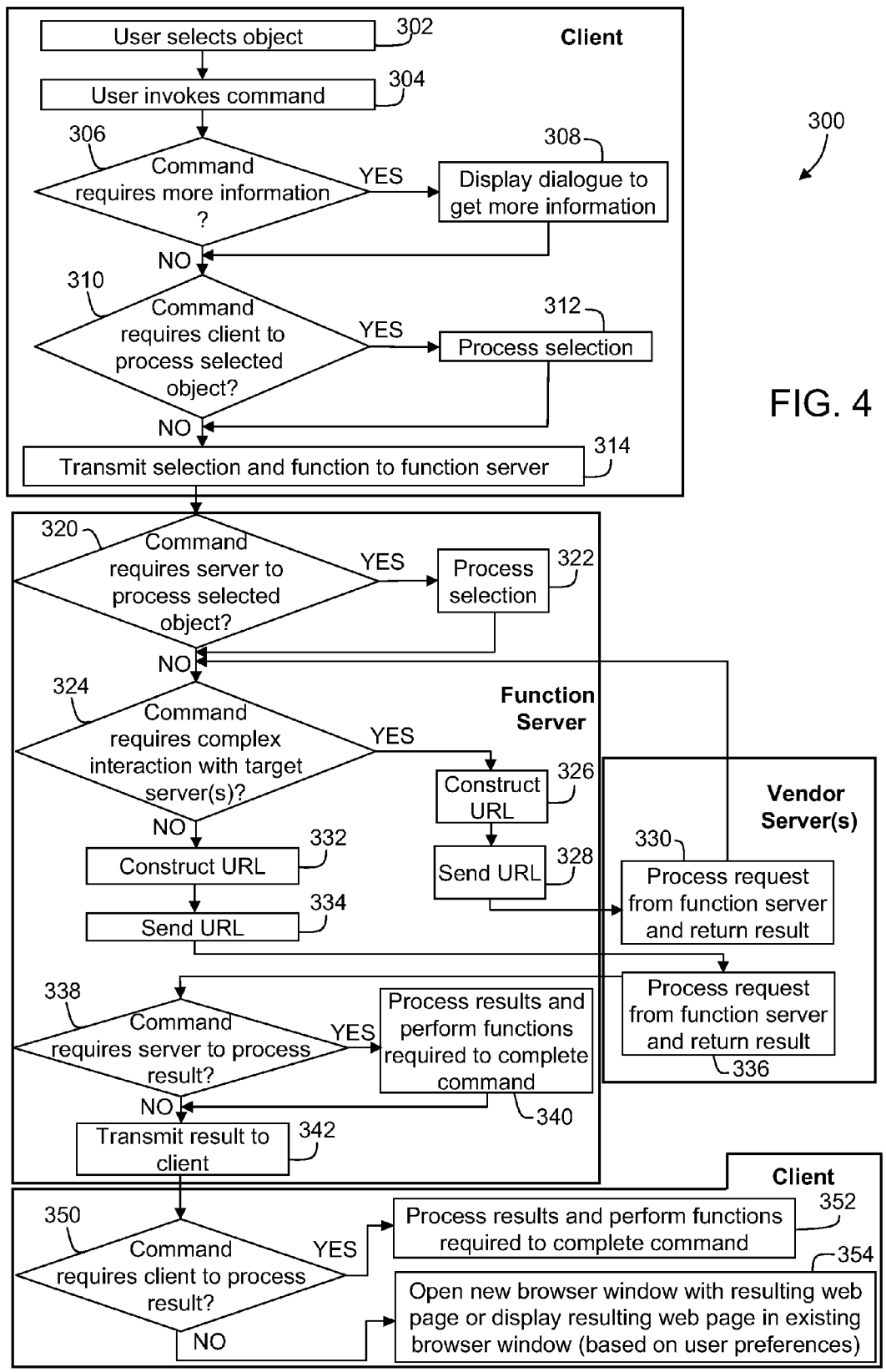
FIG. 4 is a flowchart illustrating example processes utilized by an IRS.

FIG. 4 is a flowchart 300 illustrating example processes utilized by IRS 200 (shown in FIG. 3) for retrieving information. The technical effect of IRS 200 is achieved when a user selects 302 an object or a word or words at the client system, and then invokes 304 a command. The client system then determines 306 whether the command requires more information. If the command requires more information, then the client system displays 308 a dialogue to prompt the user to provide the more information. If the command does not require more information or after receiving 308 the more information from the user, then the client system determines 310 whether the command requires the client system to process the selected object. If the command requires processing, then the client system processes 312 the selection. If the command does not require processing or after processing 312 the selection, then the client system transmits 314 the selection and function to a function server.

At the function server, the function server determines 320 whether the command requires the function server to process the selected object. If so, the function server processes 322 the selection. If the command does not require processing or after processing 322 occurs, then the function server determines 324 whether the command requires complex interaction with a vendor server. If so, the function server constructs 326 a URL and sends 328 the URL to the vendor server. The vendor server then processes 330 the request from the function server and returns a result to the function server. The function server repeats this process with the same or other vendor servers until all data required to be gathered and/or all the services required to be performed by the invoked function are completed.

If the command does not require complex interaction with a vendor server, then the function server constructs 332 a URL and sends 334 the URL to the vendor server. The vendor server then processes 336 the request from the function server and returns a result to the function server. The function server then determines 338 whether the command requires the function server to process the result. If so, the function server processes 340 the result and performs functions required to complete the command. If the command does not require the function server to process the result, then the function server transmits 342 the result to the client system.

The client system then determines 350 whether the command requires the client system to process the result. If so, the client system processes 352 the results and performs functions required to complete the command. If the command does not require the result to be processed by the client system, then the client system opens 354 a new browser window with the resulting web page or displays the resulting web page in existing browser window based on user preferences.

Figure 5:
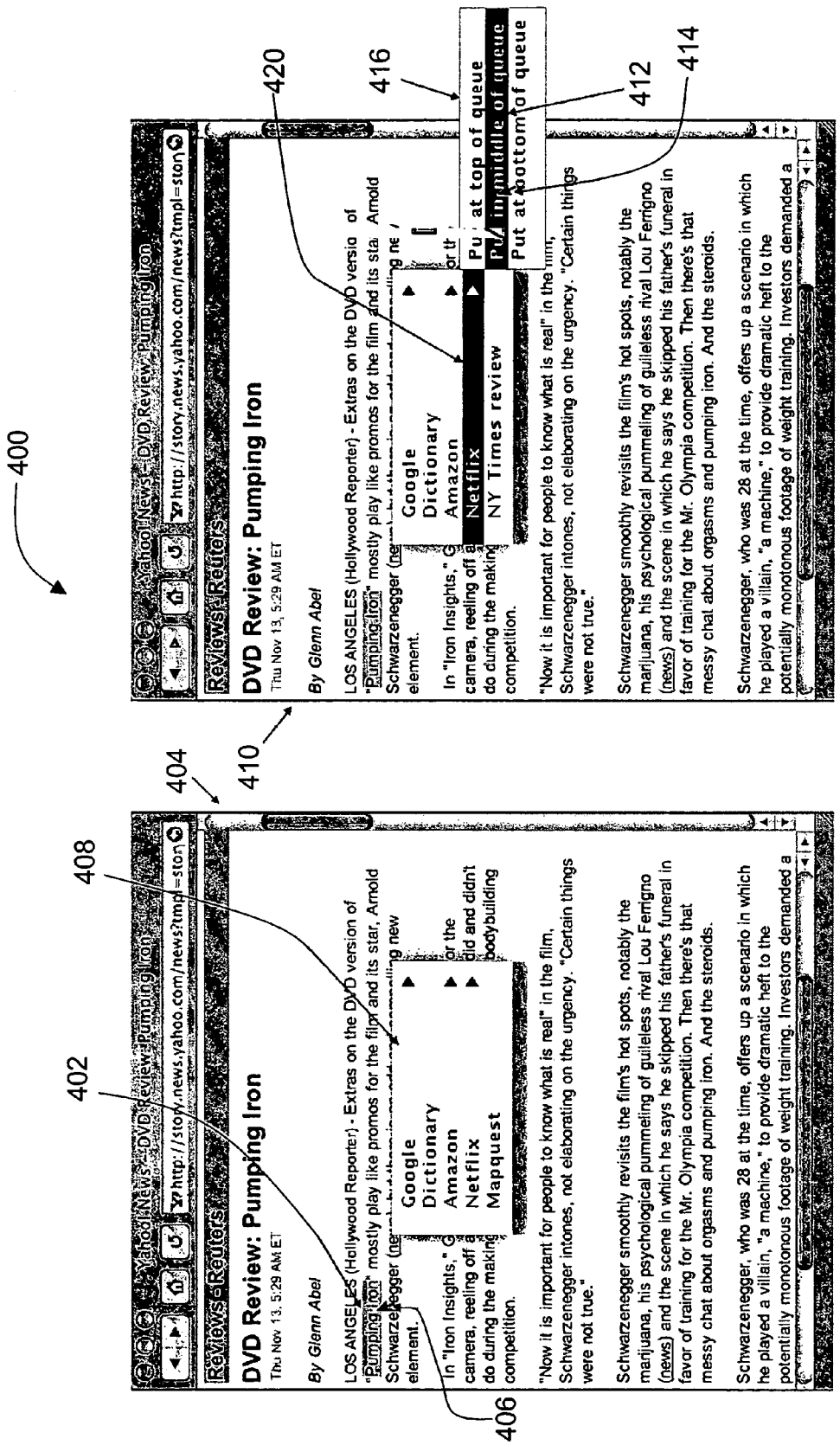
FIG. 5 is an example embodiment of an information retrieval result as requested by a user utilizing an IRS.

FIG. 5 is an example embodiment of an information retrieval result 400 as requested by a user utilizing IRS 200 (shown in FIG. 3). In the example embodiment, a user 202 (shown in FIG. 3) has selected the words "Pumping Iron" 402 from web page 404, and with pointing device 266 (shown in FIG. 3) has placed an arrow pointer 406 on those words, and, then right-clicking, to indicate to client system 204 (shown in FIG. 3) that the user wants to use the selected words 402 as input to a function. In another embodiment, a user can select an object included within the electronic document using a plurality of input devices including, but not limited to, key strokes, and voice commands. In the example embodiment, by right-clicking, the user displays a list of functions on client system 204.

In another embodiment, user 202 places arrow pointer 406 on selection 402 and using a key sequence, such as CTRL-ALT-?, which is applied when the cursor is anywhere within the selection, causes client system 204 to display a menu 408 with a list of functions that are available for invocation. In another embodiment, client system 402 displays a dialogue box with a list of functions that are available for invocation. In another embodiment, the list of functions is displayed using voice commands.

Also shown in FIG. 5 is a web page 410 that displays additional functions next to menu 408. As shown on web page 410, user 202 selects a function "Put in middle of queue" 412 by placing arrow pointer 414 over the name of function 412 in a sub-menu 416. In the example embodiment, user 202 caused sub-menu 416 to be displayed by moving arrow pointer 414 over the menu item "Netflix" 420. In an alternative embodiment, specific key sequences may be associated with specific commands and user 202 may invoke a specific command by pressing the associated key sequence while the menu is displayed.

With arrow pointer 414 over the desired function, user 202 clicks pointing device 266 and client system 204 automatically processes the selection as required by the function. In an alternative embodiment, client system 204 may require additional information to complete the function and will display a dialogue box requesting input from user 202, typically to be provide by the user using keyboard 264 (shown in FIG. 3) and/or pointing device 266 to select one of several options.

After all necessary information has been accumulated and processed by client system 204, client system 204 transmits the result of that processing along with the name of the function (or any other unique identifier) to server 214 (shown in FIG. 3) over network 210 (shown in FIG. 3). In an alternative embodiment, client system 252 (shown in FIG. 3) on intranet 220 (shown in FIG. 3) may transmit the result of that processing along with the name of the function (or any other unique identifier) to server 214 over the intranet 220 via the firewall/proxy server 222 (shown in FIG. 3) and over the network 210 to server 214.

Function server 214 receives the transmission and proceeds by performing any required processing on the transmitted data in the context of the requested function. Typically, function server 214 will construct a URL and transmit that URL to the appropriate vendor server 216 (shown in FIG. 3) over a network 210 to accomplish the requested function. Alternatively, function server 214 transmits a URL to vendor server 216 and, based on the result received from vendor server 216, may process that result and transmit another URL to vendor server 216. This process may be repeated until whatever series of steps are completed as necessary to complete the function. Alternatively, function server 214 constructs and transmits one or more URLs to several vendor servers 216, 240 and 250 (shown in FIG. 3) in order to complete a function. In another embodiment, function server 214 transmits a URL to vendor server 230 on intranet 220 via firewall/proxy server 222.

Upon receiving results from vendor server 216, function server 214 processes that result as required by the function being invoked. In an alternative embodiment, function server 214 consolidates and processes a set of results from a single vendor server 216 or a set of results from several vendor servers 216, 240, and 250. In another embodiment, function server 214 adds an advertisement or other information to the result. After function server 214 has completed its processing, the result is transmitted over network 210 to client system 204. Alternatively, function server 214 transmits the result to vendor server 230 on intranet 220 via the firewall/proxy server 222.

Upon receipt of the result, client system 204 displays a web page with the result on display 262. In an alternative embodiment, client system 204 processes the result before displaying it. In another embodiment, client system 204 may require additional information to complete the function and will display a dialogue box requesting input from the user, typically to be provide by the user using the keyboard and or the pointing device to select one of several options.

In the example embodiment, network 210 is the Internet. Alternatively or additionally, the networks include an intranet, for example, a corporate intranet.

In one embodiment, display 262 (shown in FIG. 3) includes at least one of a television, for example, a Web-TV, showing television programming which includes selectable objects on the display. The user points to an object with a pointing device, and invokes a function from a displayed list of choices.

In one embodiment, the IRS is a computer program embodied on a computer readable medium implemented utilizing Java® and Structured Query Language (SQL) with a client user interface front-end for administration and a web interface for standard user input and reports. (Java is a registered trademark of Sun Microsystems, Inc., Palo Alto, Calif.). In an example embodiment, the system is web enabled and is run on a business-entity's intranet. In yet another embodiment, the system is fully accessed by individuals having an authorized access outside the firewall of the business-entity through the Internet. In a further example embodiment, the system is being run in a Windows® NT environment (Windows is a registered trademark of Microsoft Corporation, Redmond, Wash.). The application is flexible and designed to run in various different environments without compromising any major functionality.

The systems and processes are not limited to the specific embodiments described herein. In addition, components of each system and each process can be practiced independent and separate from other components and processes described herein. Each component and process also can be used in combination with other assembly packages and processes.

There are a number of ways to implement this system. The choice of implementation architecture will depend on a number of factors including the complexity of the function to be performed, users' potential reluctance to install executables on their systems as well as other considerations.

As described above, the example embodiment, includes both a client-side application and server-side application. The client application would be configured to perform at least one of the following tasks: collecting a selected object from an electronic document; enabling the setup of the user-defined function choice mechanism; displaying the function menu and any other GUI object needed to gather information from the user; sending the selection along with the function and any additional information to the server for execution; displaying any GUI object needed to gather information from the user to specify client side actions required to complete a selected function; performing and/or invoking any client side action required to complete the selected function; enabling the application itself to be updated and reinstalled as needed; enabling the user to add, delete and modify the set of functions available to the user; and enabling the user to modify the preferences that govern specific actions of those functions and the behaviors of the client-side application itself.

In the example embodiment, the server would be configured to perform at least one of the following tasks: providing a list of defined functions and documentation for their use; providing for download client software for desired functions; collecting and managing user preference information as it pertains to the invocation of functions; receiving the selection along with the function and any additional information from the client for execution; processing the selection and additional information within the context of the specified function; interacting with the vendor web server in whatever way necessary to complete the transaction; and returning the resulting web page or other output to the client application.

The example embodiment described above facilitates avoiding at least one of the following difficulties: eliminates the need for frequent upgrades due to changes in how a vendor server processes requests and handles URLs because the update would occur on the server not on each of the individual clients; minimizes the possibility for software conflicts based on the clients' configuration as the client application has minimal functionality; and allows for upgraded functionality and performance of the system with no or minimal need for updated client software.

In an alternative embodiment, all of the functions that are assigned to the server (above) could be performed by the client-side application.

In another embodiment, the system could be implemented as a browser plug-in without any reliance on a server. Such a system would include at least one of the following attributes: selecting objects that were displayed in the browser itself; interacting with web sites that could perform desired functions via a constructed URL; and performing client-side post-processing functions that could be performed by the browser application itself at the direction of the plug-in.

While the invention has been described in terms of various specific embodiments, those skilled in the art will recognize that the invention can be practiced with modification within the spirit and scope of the claims.

What is claimed is:

1. A method for retrieving information using a server system coupled to a centralized database and at least one client system, said method comprising:
    storing user preference information in the database including a list of functions defined by a user of the at least one client system for inclusion within a function menu, wherein each function is associated by the user with at least one universal resource locator (URL) and a computer-implemented command for performing the associated function,
    wherein the computer-implemented command is configured by the user to perform the associated function at least one remote vendor web server corresponding to the at least one associated URL; and
    wherein the command comprises at least two separate processing requirements to perform the associated function;
    causing the function menu to be displayed on the client system to prompt the user to select a desired function from the list of user-defined functions included within the function menu to apply the selected function to a selected object, wherein the selected object is an object included within an electronic document displayed on the at least one client system and selected by the user;
    receiving, at the server system, the selected object and the selected function from the at least one client system;
    processing the selected object by sequentially applying the at least two separate processing requirements to apply the selected function to the selected object at the server system to generate a processed object, the processing comprising:
        retrieving from the database the at least one URL and the computer-implemented command associated with the selected function;
        executing a first one of the processing requirements of the retrieved computer-implemented command using the selected object to generate a first processed object;
        transmitting the first processed object from the server system to at least one remote vendor web server corresponding to the at least one retrieved URL;
        executing a second one of the processing requirements of the retrieved computer-implemented command based on the selected object to generate a second processed object;
        transmitting the second processed object from the server system to the least one remote vendor web server corresponding to the at least one retrieved URL;
        receiving a processing result from the at least one remote vendor web server at the server system, the processing result generated by the at least one remote vendor web server based on the combination of the first and second processed objects and including at least a resulting web page;
    determining whether further processing of each processing result is necessary to complete the selected function;
    transmitting at least one of each processing result and other output to the client system;
    causing the client system to process the at least one resulting web page and the other output; and
    prompting the user to select a command to perform using the at least one resulting web page.

2. A method in accordance with claim 1 wherein causing the function menu to be displayed further comprises prompting the user to select an object including at least one of text, a hyperlink, a picture, a sound file, a video file, and any selectable object included within the electronic document.

3. A method in accordance with claim 1 wherein causing the function menu to be displayed further comprises:
    processing the selected object using optical character recognition (OCR);
    extracting text from the selected object using OCR; and
    transmitting at least a portion of the extracted text from the client system to the server system such that the server system processes the extracted text.

4. A method in accordance with claim 1 wherein causing the function menu to be displayed further comprises utilizing a text-grabbing algorithm to select the object.

5. A method in accordance with claim 1 wherein causing the function menu to be displayed on the client system further comprises enabling the user to designate a first web site as a target web site for a first function included within the function menu, and associate a first computer-implemented command with the first function executable using the first web site, the first computer-implemented command formatted by the user of the at least one client system to perform a purchasing function at the target web site.

6. A method in accordance with claim 1 wherein causing the function menu to be displayed on the client system further comprises enabling the user to customize the function menu by selecting each function included within the function menu.

7. A method in accordance with claim 1 wherein causing the function menu to be displayed on the client system further comprises displaying the function menu on the client system by utilizing at least one of a mouse, a keyboard, a track-ball, a joystick, a digitizing pad, a touch screen, a voice activation device, and any input device connected to the client system.

8. A method in accordance with claim 1 wherein processing the selected object by applying the selected function at the server system further comprises:
applying the user preference information to the selected object, wherein the user preference information includes a first purchasing function associated with a first purchasing command and a plurality of URLs, the first purchasing command formatted to purchase an item corresponding to the selected object based on a purchase price for the item;
communicating with a vendor web server corresponding to each of the plurality of URLs;
generating a processing result at each of the vendor web servers by processing the selected object;
transmitting the processing results from each of the vendor web servers to the server system; and
processing each of the processing results at the server system before transmitting at least one resulting web page and other output to the client system.

9. A network based system for retrieving information, said system comprising:
a client system comprising a user interface and a browser;
a centralized database for storing information; and
a server system configured to be coupled to said client system and said database, said server system further configured to:
enable a user to input user preference information for storing in the database, the user preference information including a list of functions defined by the user for inclusion within a function menu, wherein each function is associated by the user with at least one universal resource locator (URL) and a computer-implemented command for performing the associated function, wherein the computer-implemented command is configured by the user to perform the associated function at least one remote vendor web server corresponding to the at least one associated URL; and the computer-implemented command comprises at least two separate processing requirements to perform the associated function;
enable the user to select an object from an electronic document displayed on said user interface;
cause the function menu to be displayed on said user interface to prompt the user to select a desired function from the list of user-defined functions included within the function menu to apply the selected function to a selected object, wherein the selected object is an object included within an electronic document displayed on said client system and selected by the user;
receive the selected object and the selected function from said client system;
process the selected object by applying the at least two separate processing requirements to apply the selected function to the selected object to generate a processed object the process comprising:
retrieving from the database the at least one URL and the computer-implemented command associated with the selected function;
executing a first one of the processing requirements of the retrieved computer-implemented command using the selected object to generate a first processed object;
transmitting the first processed object from said server system to at least one remote vendor web server corresponding to the at least one retrieved URL;
executing a second one of the processing requirements of the retrieved computer-implemented command based on the selected object to generate a second processed object;
transmitting the second processed object from the server system to the least one remote vendor web server
receiving a processing result from the at least one remote vendor web server at said server system, the processing result generated by the at least one remote vendor web server based on the combination of the first and second processed objects and including at least a resulting web page;
determine whether further processing of each process result is necessary to complete the selected function;
transmit at least one of each process result and other output to said client system; and
cause the client system to process the at least one resulting web page and the other output; and
prompt the user to select a command to perform using the at least one resulting web page.

10. A system in accordance with claim 9 wherein said client system configured to apply a text-grabbing algorithm to select the object.

11. A system in accordance with claim 9 wherein said client system configured to display a function menu on said user interface in response to a command from at least one of a mouse, a keyboard, a track-ball, a joystick, a digitizing pad, a touch screen, a voice activation device, and any input device connected to said client system.

12. A system in accordance with claim 9 wherein said client system further comprises at least one of a cell phone, a computer, a personal digital assistant (PDA), and a television.

13. A system in accordance with claim 9 wherein said server system is further configured to:
cause said client system to process the selected object using optical character recognition (OCR);
cause said client system to extract text from the selected object using OCR; and
cause said client system to process at least a portion of the extracted text by applying the selected function.

14. A system in accordance with claim 9 wherein said server system further configured to enable the user to designate a first web site as a target web site for a first function included within the function menu, and associate a first computer-implemented command with the first function executable using the first web site, the first computer-implemented command formatted by the user to perform a purchasing function at the target web site.

15. A system in accordance with claim 9 wherein said server system further configured to enable the user to customize the function menu by selecting each function included within the function menu.

16. A system in accordance with claim 9 wherein said server system further configured to:
- apply the user preference information to the selected object, wherein the user preference information includes a first purchasing function associated with a first purchasing command and a plurality of URLs, the first purchasing command formatted to purchase an item corresponding to the selected object based on a purchase price for the item;
- communicate with a vendor web server corresponding to each of the plurality of URLs;
- receive a processing result from each of said vendor web servers;
- process each of the processing results; and
- transmit at least one resulting web page and other output to said client system based on the processing results.

17. A non-transitory computer readable medium having embodied thereon computer-executable instructions for retrieving information using a server system coupled to a client system, a database, and a remote vendor web server, the client system including a user interface, said computer-executable instructions cause the server system to:
- store user preference information in the database including a list of functions defined by a user of the client system for inclusion within a function menu, wherein each function is associated by the user with at least one universal resource locator (URL) and a computer-implemented command for performing the associated function, wherein the computer-implemented command is configured by the user to perform the associated function at the remote vendor web server corresponding to the at least one associated URL; and
  - wherein the computer-implemented command comprises at least two separate processing requirements to perform the associated function;
- prompt the user to select an object from an electronic document displayed on the user interface;
- cause the function menu to be displayed on the user interface to prompt the user to select a desired function from the list of user-defined functions included within the function menu to apply the selected function to the user selected object;
- receive the selected object and the selected function from the client system;
- process the selected object by sequentially applying the at least two separate processing requirements to apply the selected function to the selected object to generate a processed object, the process comprising:
  - retrieving from the database the at least one URL and the computer-implemented command associated with the selected function;
  - executing a first one of the processing requirements of the retrieved computer-implemented command using the selected object to generate a first processed object;
  - transmitting the first processed object from the server system to the remote vendor web server corresponding to the at least one retrieved URL;
  - executing a second one of the processing requirements of the retrieved computer-implemented command based on the selected object to generate a second processed object;
  - transmitting the second processed object from the server system to at least one remote vendor web server corresponding to the at least one retrieved URL;
  - receiving a processing result from the remote vendor web server at the server system, the processing result generated by the remote vendor web server based on the combination of the first and second processed objects and including at least a resulting web page;
- determine whether further processing of each process result is necessary to complete the selected function;
- transmit at least one of each process result and other output to the client system;
- cause the client system to process the at least one resulting web page and the other output; and
- prompt the user to select a command to perform using the at least one resulting web page.

18. A non-transitory computer readable medium in accordance with claim 17 further comprising a code segment that:
- causes the client system to process the selected object using optical character recognition (OCR);
- causes the client system to extract text from the selected object using OCR; and
- causes at least a portion of the extracted text to be transmitted from the client system to the server system for further processing.

19. A computer program in accordance with claim 17 further comprising a code segment that utilizes a text-grabbing algorithm to select the object.

20. A computer program in accordance with claim 17 further comprising a code segment that enables the user to designate a first web site as a target web site for a first function included within the function menu, and associate a first computer-implemented command with the first function executable using the first web site, the first computer-implemented command formatted by the user of the at least one client system to perform a purchasing function at the target web site.

21. A computer program in accordance with claim 17 further comprising a code segment that enables the user to customize the function menu by selecting each function included within the function menu.

22. A computer program in accordance with claim 17 further comprising a code segment that:
- applies the user preference information to the selected object, wherein the user preference information includes a first purchasing function associated with a first purchasing command and a plurality of URLs, the first purchasing command formatted to purchase an item corresponding to the selected object based on a purchase price for the item;
- communicates with a vendor web server corresponding to each of the plurality of URLs;
- receives a processing result from each of the vendor web servers;
- processes each of the results at the server system; and
- transmits at least one resulting web page and other output to the client system.

* * * * *